United States Patent [19]

Karg et al.

[11] Patent Number: 5,145,628
[45] Date of Patent: Sep. 8, 1992

[54] PROCESS FOR MANUFACTURING A HOSE CLAD WITH ULTRA-HIGH MOLECULAR WEIGHT POLYETHYLENE

[76] Inventors: Rudolph Karg, 3039 Woodland Ridge Blvd., Baton Rouge, La. 70816; Robert Kirschbaum, Vriendenkringstraat 55, 6141 LH Sittard, Netherlands

[21] Appl. No.: 770,145

[22] Filed: Oct. 3, 1991

Related U.S. Application Data

[63] Continuation of Ser. No. 470,650, Jan. 26, 1990, abandoned, which is a continuation-in-part of Ser. No. 456,786, Dec. 29, 1989, abandoned.

[51] Int. Cl.$^5$ .................... B29C 63/06; B32B 1/08
[52] U.S. Cl. .................... 264/248; 156/149; 156/244.13; 264/255
[58] Field of Search ............ 264/248, 255; 156/148, 156/169, 218, 212, 244.13, 308.2, 308.4, 309.9, 242

[56] References Cited

U.S. PATENT DOCUMENTS

| | | | |
|---|---|---|---|
| 3,899,378 | 8/1975 | Wragg et al. | 156/309.6 |
| 4,099,425 | 7/1978 | Moore | 156/244.13 |
| 4,158,033 | 6/1979 | Stefano et al. | 156/244.13 |
| 4,211,595 | 7/1980 | Samour | 156/244.13 |
| 4,238,260 | 12/1980 | Washkewicz | 156/244.13 |
| 4,501,632 | 2/1985 | Landgraf | 156/308.2 |
| 4,654,096 | 3/1987 | Jant et al. | 156/149 |
| 4,938,820 | 7/1990 | McMills | 156/218 |

FOREIGN PATENT DOCUMENTS

| | | |
|---|---|---|
| 141418 | 5/1985 | European Pat. Off. |
| 292074 | 11/1988 | European Pat. Off. |
| 1567289 | 3/1968 | France |
| 62-138230 | 6/1987 | Japan |
| 2164897 | 4/1986 | United Kingdom |

OTHER PUBLICATIONS

Modern Plastics Encyclopedia, (1981-1982), p. 70.

Primary Examiner—Jay H. Woo
Assistant Examiner—Khanh P. Nguyen
Attorney, Agent, or Firm—Cushman, Darby & Cushman

[57] ABSTRACT

The invention relates to a process for manufacturing a hose including a layer of ultra-high molecular weight polyethylene on at least the inside or the outside, which layer is directly bonded to an elastomeric layer, the layer of polyethylene being provided by folding an oblong polyethylene film to form an oblong tube with an overlapping seam in its longitudinal direction, resulting in a hose fit for uses, even at low temperatures, in which the inside and/or the outside of the hose are/is exposed to the action of chemical substances and/or of substances having a strongly abrasive action.

3 Claims, 1 Drawing Sheet

6559

PROCESS FOR MANUFACTURING A HOSE CLAD WITH ULTRA-HIGH MOLECULAR WEIGHT POLYETHYLENE

This is a continuation of application Ser. No. 07/470,650, filed on Jan. 26, 1990, which was abandoned upon the filing hereof which is a continuation-in-part of application Ser. No. 07/456,786, filed Dec. 29, 1989 now abandoned.

The invention relates to a process for manufacturing a hose, at least the inside or the outside of which is clad with a layer of ultra-high molecular weight polyethylene which is directly bonded to an elastomeric layer.

BACKGROUND AND SUMMARY OF THE INVENTION

Such a method is known from the French Patent Specification FR-1,567,289. In said method, a polyethylene film having a melt flow index of not more than 0.15 is wound helically around a mandrel, the consecutive windings partially overlapping one another, followed by the provision of an elastomeric layer containing a vulcanizing agent and a sheath which tightly encloses this entity, after which the mutually overlapping parts of the polyethylene windings are fused together and the polyethylene layer and the elastomeric layer are bonded to one another at the same time as the vulcanization of the elastomeric layer. The said melt flow index is determined in accordance with ASTM standard 1238-57 T, with an additional weight of 3 kg being added. A melt index of 0.15 determined in this manner corresponds to a weight-average molecular weight $M_w$ of approximately $0.5 \times 10^6$ kg/kmol.

A disadvantage of this known process is that said helical winding is less suitable for manufacturing hoses in a simple manner and with adequate production speed in a continuous process.

The object of the invention is to provide a process which does not have the said disadvantage.

This object is achieved, according to the invention, in that the polyethylene layer is installed by folding a polyethylene film round in the longitudinal direction in an overlapping manner.

The process according to the invention is found to be extremely suitable for manufacturing, in a continuous process, a hose, clad at least on the inside or outside with a polyethylene layer, in large uninterrupted lengths and with a production speed which is approximately 3-10 times greater than is possible with the known process.

A further advantage of using this method of installing the polyethylene film is that the total surface area of the overlapping seams in the polyethylene cladding layer, in particular if the ratio between the width of the overlap and the diameter of the hose is relatively large, that is to say, especially in the case of hoses having a relatively small diameter, is significantly smaller than in the case of the known process for installing the polyethylene layer, and this commensurately decreases the risk of defects occurring in fusing the seams together and, in addition, results in an appreciable material saving.

It is also an advantage of the process according to the invention that the conventional equipment for manufacturing hoses without a cladding layer can be used as it is or with only minor adaptations.

The process according to the invention can also be used for installing a polyethylene cladding layer on the outside of a hose. In that case, the elastomeric layer is first installed around the mandrel, for example by extrusion, and then the polyethylene film is folded round it. As is usual in vulcanizing rubber hoses, a sheath is then installed around the entity.

By installing the various layers in the desired sequence around the mandrel in one and the same or in consecutive process steps it is also possible to manufacture a hose provided with a polyethylene cladding layer both on the inside and on the outside.

In addition, the process according to the invention can be used to manufacture a hose which contains more than one identical, and if the application requires it, also more than one different, elastomeric layer, if desired, alternating with other layers frequently used in hoses, such as, for example, armouring layers and barrier layers of materials suitable for the purpose, provided only that the polyethylene cladding layer is installed directly adjacently to an elastomeric layer.

A further advantage of the method according to the invention is that it can be used with equally beneficial results starting from already vulcanized hoses. In that case, it is possible to dispense with the use of a mandrel for installing a polyethylene cladding layer on the outside of the hose if desired, because the vulcanized hose in general already has per se adequate stability of shape.

BRIEF DESCRIPTION OF THE DRAWINGS

Further objects and advantages of the present invention will be better understood by carefully reading the following detailed description of the presented preferred exemplary embodiments of this invention in conjunction with the accompanying drawing.

DETAILED DESCRIPTION OF THE INVENTION

Figure 1:
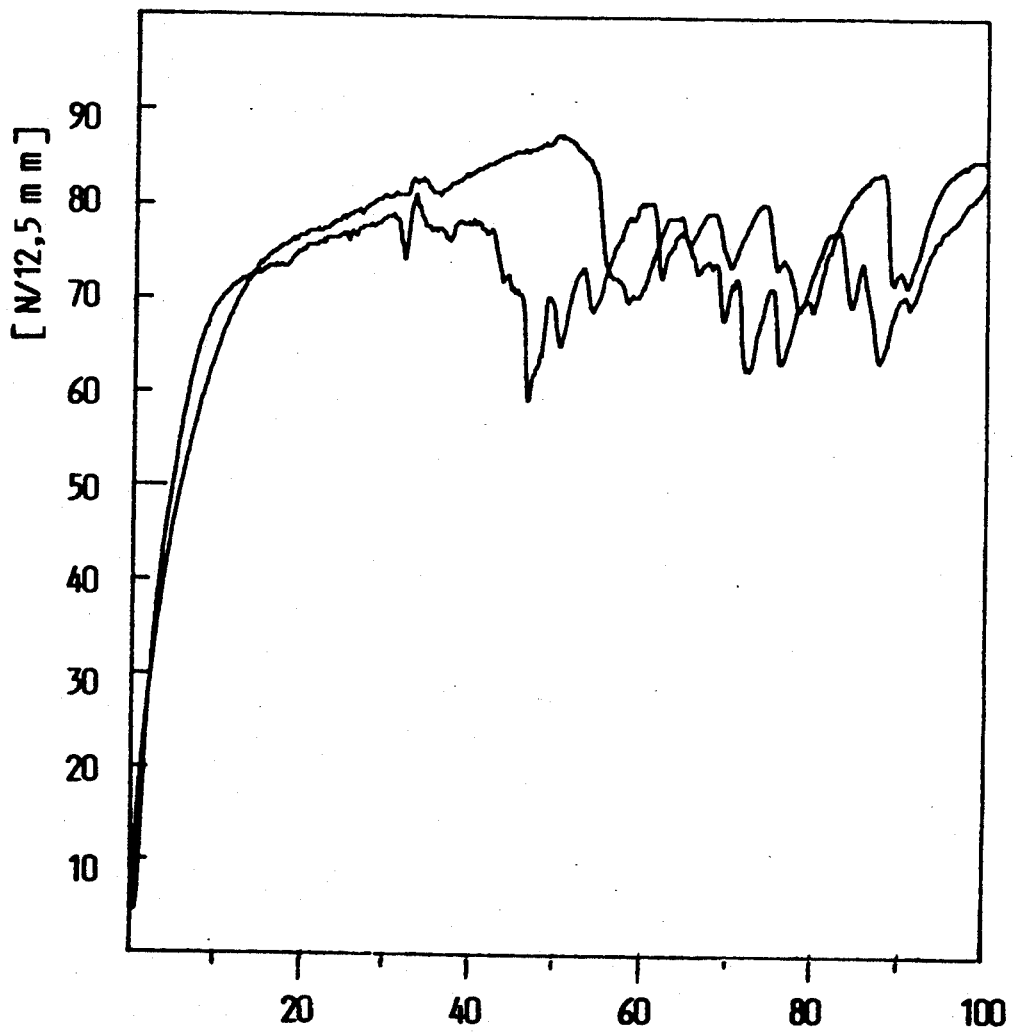
FIG. 1 shows the force necessary for pealing of the polyethylene layer from the rubber layer resulting from two separate tests pursuant to Example I.

The width of the polyethylene film is in practice chosen as equal to the inside circumference or outside circumference of the hose to be clad, with the desired width of the overlapping seam added. The width of the overlapping seam is chosen as small as possible without adversely affecting the degree of sealing of said seam and it is even possible, if use is made of polyethylene films having a thickness of more than, for example, 0.3 mm, to use a butt seam. With a view to limiting material usage as far as possible, the width of the overlapping seam is preferably less than 10 mm.

The process according to the invention uses ultra-high molecular weight linear polyethylene, hereinafter designated UHMWPE, having a weight-average molecular weight M, of not less than $0.5 \times 10^6$ kg/kmol and preferably of not less than $1 \times 10^6$ kg/kmol.

The weight-average molecular weight of UHMWPE is determined by the methods known for this purpose; such as gel permeation chromatography and light scattering, or is calculated from the intrinsic viscosity (IV) determined in decalin at 135° C. The said weight-average molecular weights of 0.5 and $1.0 \times 10^6$ kg/kmol correspond to an IV in decalin at 135° C. of 5.1 and 8.5 dl/g, respectively, in accordance with the empirical relationship:

$$M_w = 5.37 \times 10^4 [IV]^{1.37}.$$

In this connection, UHMWPE is understood to mean linear polyethylene having less than one side chain per 100 carbon atoms and, preferably, having less than one side chain per 300 carbon atoms and such a polyethylene which may also contain minor quantities, preferably less than 5 mol %, of one or more further alkenes, such as propene, butene, pentene, hexane, 4-methylpentene, octane etc., copolymerized therewith, which polyethylene or copolymer of ethylene has a weight-average molecular weight of not less than $0.5 \times 10^6$ kg/kmol.

The polyethylene may furthermore contain minor quantities, preferably not more than 25% by weight, of one or more further polymers, in particular a 1-alkene polymer such as polypropene, polybutadiene or a copolymer of propene with a minor quantity of ethene.

Such a UHMWPE may be manufactured, for example, with the aid of a Ziegler or a Phillips process using suitable catalysts and under known polymerization conditions.

UHMWPE has a number of properties which makes it very suitable as a cladding layer on the inside and outside of hoses. Such properties are, in particular, the high wear resistance and flexural strength, the high chemical resistance and the low coefficient of friction, and in addition, the high impact strength and tensile strength.

The polyethylene film from which the polyethylene layer is formed in the process according to the invention can be manufactured by processes and techniques known per se, such as, for example, ram extrusion or compression of UHMWPE powder or granules at a temperature above the melting point of the polyethylene to form a layer of the desired thickness, or by paring a layer of the desired thickness off an object composed of polyethylene obtained by ram extrusion or compression.

A polyethylene film which is obtained from linear, highly crystalline polyethylene which has not yet been fused or dissolved is very suitable for manufacturing a hose with the aid of the process according to the invention. Said polyethylene and a process for the production thereof is known per se from U.S. Pat. No. 4,769,433 and from "Ziegler-Natta Catalysts and Polymerization", by J. Boor, Academic Press Inc., page 202. An essential characteristic of said processes is that, during the polymerization, the temperature of the polyethylene does not rise above the melting point of the polyethylene. The polyethylene obtained in this manner is distinguished from polyethylene formed at higher temperature by a very high crystallinity, a high melting point and a high enthalpy of fusion. The values of these parameters are, respectively, not less than 60%, and preferably not less than 75%, 140° C. and 220 Joules/gram. A further characteristic of polyethylene obtained in this manner when used according to the invention is that it has an enthalpy of fusion before bonding which is not less than 10%, and preferably more than 20, higher than the enthalpy of fusion of the polyethylene in the object obtained, the anthalpies of fusion being determined with the aid of differential scanning calorimetry at 10° C./min. The polyethylene powder obtained by this process can be used in the process according to the invention in the form of a continuous UHMWPE layer which is obtained from the powder by compression or ram extrusion at a temperature below the melting point of the polyethylene. In order to obtain thinner UHMWPE layers than is possible directly by compression or ram extrusion, the compressed polyethylene layer obtained can be stretched in one or more directions before being bonded to the elastomeric layer. This stretching is preferably carried out at a temperature which is situated not more than 70° C. below the melting point of the polyethylene under the prevailing conditions.

EP-A-292,074 reveals a process in which the powder is mixed before compression with a solvent in a quantity of 1-100% by weight based on the polyethylene. Suitable solvents are, for example, aliphatic hydrocarbons, paraffin oil or paraffin wax, aromatic hydrocarbons such as xylene, or hydrogenated aromatics such as decalin and tetralin. UHMWPE layers manufactured with the aid of this process may also be used, if desired after completely or partially removing the solvent, as a polyethylene layer to be bonded in the process according to the invention. From EP-A-292,074 it is also known to stretch the layer obtained by compressing the UHMWPE powder, if desired after removing the solvent, in one or more directions. Such stretched layers may also be used as the polyethylene layer to be bonded in the process according to the invention.

Preferably, the polyethylene film is manufactured by removing solvent from a layer of polyethylene gel. Processes for obtaining such a layer of UHMWPE gel are known per se from GB-A-2,164,897, EP-A-64,167 and EP-A-141,418. The concentrations of the UHMWPE in the solution from which the layer of polyethylene gel is formed are between 0.5 and 60% by weight in the said known processes. In each specific case, the maximum usable concentration within these limits is determined only by the requirement that the viscosity of the solution permits the processing thereof with the techniques used.

The thickness of the polyethylene film manufactured by these known processes is between 0.05 and 5 mm, preferably between 0.1 and 2 mm. From the said known processes it is also known to manufacture thinner polyethylene layers, down to approximately 1 μm, by applying a stretching during the process in at least one direction. Such stretched films may also be used as the UHMWPE layer in the process according to the invention. Porous UHMWPE layers can also be used, as they are or stretched, under the abovementioned conditions in various thicknesses as the polyethylene layer to be bonded in the process according to the invention. Processes for obtaining a porous polyethylene film are known per se, for example from the European Patent Application EP-A-160,551. In this method, a very ample variation in the thickness of the polyethylene layer can be achieved.

A further advantage of the preferred process is that polyethylene films can be obtained in this manner in a continuous process and consequently in very large, virtually infinite lengths.

Surprisingly, although said polyethylene layers obtained from a gel are particularly brittle and do not therefore appear suitable as a cladding layer for hoses, it is, however, found that the polyethylene layer in the hose manufactured according to the invention again has the normal toughness and the other excellent mechanical and chemical properties inherent in UHMWPE mentioned above. It is found, furthermore, that, in the process according to the invention, a very strong mutual bonding occurs between the polyethylene and the elastomer and between the mutually overlapping parts of the polyethylene layer, and it is found, in addition, that the overlapping parts have flowed out to form a virtually continuous sheet and a completely smooth surface.

The morphology of the polyethylene layer in the hose, if said layer is obtained from linear, highly crystalline ultra-high molecular weight polyethylene which has not yet been fused of dissolved or by removing solvent from a layer of polyethylene gel appears to differ from that of a polyethylene layer which is obtained in another manner, for example by ram extrusion or compression of UHMWPE powder above the melting point. In particular, it has been shown with the aid of transmitted light microscopy that the polyethylene layer has a homogeneous structure in the first mentioned cases, in contrast to the last mentioned polyethylene layer, which has a distinct powder morphology. The same difference in morphology can be seen at the surface of the polyethylene layer if the latter has been allowed to swell in a solvent. This observation is in agreement with that which is known from the non-prior-published Dutch Patent Application NL-8902682.

An elastomer within the scope of the invention is defined as a substance which can be stretched by force at room temperature to twice its original length and within a short time returns, at least to an approximation, to its original length after the stretching force is removed (see Glossary of Terms as issued by the ASTM Committee D11 on Rubber and Rubber-like Materials).

As elastomers in manufacturing the hose according to the invention, use may be made of any known elastomeric materials such as, for example, natural rubber, copolymers of butadiene and acrylonitrile, butadiene/styrene copolymers, copolymers of butadiene and alkyl acrylates, butyl rubber, olefin rubbers such as ethylene/propene and EPDM rubber, fluorocarbon rubber, silicon rubber, polyacrylates, polybutadiene and polychloroprene.

An elastomaric layers in manufacturing the hose according to the invention, use is preferably made of EP(D)M rubbers and styrene/butadiene copolymers or mixtures of at least one of said elastomers with at least one other elastomer. The conventional additives, such as, for example, fillers, plasticizers, stabilizers, colorants, antistatic agents, lubricating and release agents, flame retardants and substances which promote barrier properties may be added to the elastomer.

In the process according to the invention, a polyethylene film is folded round in an overlapping manner in the longitudinal direction. Processes for installing, in this manner, a layer of cladding material around an elongated tubular object are known per se, for example, from the Japanese Patent Application JP-A-62/138,230 and the Belgian Patent Application BE-A-878,980, in which a layer of thermoplastic material is installed in the said manner on a metal pipe. In said known processes, the overlapping seam in the folded-round film is first sealed by fusion before the polyethylene layer is processed with the object to be clad to produce a final product. However, this process cannot be used in a continuous process with high production speed if UHMWPE is used as the thermoplastic material, owing to the poor weldability of said material.

In the process according to the invention, the overlapping seam is not sealed during or immediately following the installation of the polyethylene layer, but this is carried out at the same time as the bonding of the polyethylene layer to the elastomeric layer. The polyethylene layer is fixed between the instant of installation and the bonding process by a sheath which is usually installed around it in the manufacture of hoses, for example a lead layer extruded around it if the polyethylene layer is installed on the outside of the hose, and by the elastomeric layer installed around it if the polyethylene layer is installed on the inside of the hose.

An important step in manufacturing the hose according to the process is the mutual bonding of the mutually overlapping portions of the polyethylene layer and the bonding of the polyethylene layer to the elastomeric layer. Both bonding processes should be carried out at a temperature above the melting point of the polyethylene and under pressure, which is supplied by the sheath installed in the techniques conventionally used in manufacturing rubber hoses.

To obtain a good bonding both of the mutually overlapping parts of the polyethylene layer installed and of the polyethylene layer to the elastomeric layer, starting from an already vulcanized hose, the process conditions are as follows: the temperature should be above the melting point of the polyethylene used but should, however, be chosen as low as possible in order to prevent thermal degradation of the polyethylene as much as possible. In general, the melting point of polyethylene having an $M_w$ higher than $0.5 \times 10^6$ kg/kmol is between approximately 130° C. and 160° C. The pressure may vary between 0.2 and 10 MPa, preferably between 0.4 and 1 MPa. The time during which these conditions should be maintained as a minimum may be between 30 sec and 600 sec, depending, inter alia, on the thickness of the polyethylene layer used. The time needed in any specific case can be determined experimentally in a simple manner by the average person skilled in the art.

The process conditions mentioned are such that even if a hose which still has to be vulcanized is used, the process conditions required for the vulcanization can usually be chosen without difficulty without coming into conflict with the process conditions for mutually obtaining a good bonding between the overlapping parts of the polyethylene layer and between the polyethylene layer and the elastomeric layer. The vulcanization process of elastomers usually proceeds, in particular, in a temperature region and pressure region of, respectively, 120°–180° C. and above 0.2 MPa over a period of 10 to 30 minutes. An important variable is the activation temperature and the vulcanizing rate of the vulcanizing agent or vulcanizing system used. It is therefore usually possible to adapt the vulcanization process conditions to those of the two bonding processes mentioned.

If, for a certain combination of the elastomer and vulcanization system used in the hose, the process conditions required for the vulcanization are such that there is a risk of degradation of the polyethylene layer to be provided, it is preferable to first carry out the vulcanization of the hose on which a polyethylene cladding layer is not yet installed and then to install the polyethylene layer on the already vulcanized hose under the above described process conditions needed for this purpose. This may, for example, be necessary if the hose contains thick elastomeric layers which require long vulcanizing times.

Possible uses of the hose according to the invention are, for example, those in which the inside and/or the outside of the hose are/is exposed to the action of chemical substances and/or of substances having a strongly abrasive action, even at low temperatures.

The invention is explained with reference to the exemplary embodiments below, without, however, being restricted thereto.

EXAMPLE I

A linear polyethylene having an IV in decalin at 135° C. of 15.5 dl/g, corresponding to a weight-average molecular weight $M_w$ of $2.2 \times 10^6$ kg/kmol (Himont 312$^R$), was dissolved in decalin to give a concentration of 15% by weight and to form a homogeneous solution by extruding an appropriate mixture of polyethylene and decalin at a temperature of 180° C. using a twin-screw extruder. The head of the extruder was provided with a wide nozzle having a 0.5 mm extrusion slit through which the solution was extruded to form a strip which was cooled in a water bath maintained at 20° C., in which process a gel film was formed. Decalin was removed from the gel film thus obtained, by evaporation in a hot-air oven until no residual decalin content could be measured. The polyethylene film obtained was approximately 10 cm wide and 300 μm thick.

An unvulcanized hose was manufactured by first extruding a layer of an unvulcanized NBR mixture around a flexible round mandrel, braiding the former with steel wire and extruding a layer of an unvulcanized SBR/NBR mixture around the latter. The total diameter of the hose was approximately 3 cm.

The unvulcanized hose obtained was fed into a lead sheathing machine, in which process the above described polyethylene film was folded round the hose at the beginning of the hose and was secured at that point. As the hose was fed into the sheathing machine, the polyethylene film was fed in at the same time and, without further measures being found to be necessary during this feeding-in, folded round the hose in the conical opening of the sheathing machine, after which a lead sheath was installed around the whole in the machine for the purpose of the subsequent vulcanization process. The width of the overlapping seam formed during folding round was approximately 4 mm.

The unvulcanized hose, provided with a lead sheath, was wound onto a reel and vulcanized for approximately 25 minutes at a temperature of 160° C. After removing the lead sheath, the vulcanized hose was removed from the mandrel. The polyethylene layer on the hose had a flat and smooth surface in which the overlapping seam was hardly still visible.

Two cuts were made continuously in the circumferential direction with a mutual spacing of 12.5 mm in the PE layer on the hose, then the circumferential element was cut in the longitudinal direction of the hose, after which one end thereof was clamped in the clamp of a pulling bench and the hose was pushed around a metal rod which was fixed with respect to the base of the pulling bench. The PE layer of the hose was peeled off by moving the uppermost clamp of the pulling bench upwards with a speed of 100 mm/minute, it being possible for the hose to rotate freely around the rod. As the polyethylene layer was peeled off the rubber layer bonded thereto, the polyethylene layer did not release the rubber layer but the rubber layer was pulled apart.

The force necessary for the peeling-off is shown in FIG. 1, plotted against the clamp displacement, the 2 curves corresponding to 2 separate tests.

The flexibility of the hose clad with the polythene layer differs only slightly from that of a hose which, apart from the installation of the polyethylene layer, was manufactured in an otherwise identical manner. No delamination occurred between the polyethylene layer and the rubber layer during prolonged and repeated bending of the hose.

We claim:

1. Process for manufacturing a hose having at least the inside or the outside clad with a layer of polyethylene having an intrinsic viscosity in decalin at 135° C. of at least 5.1 dl/g, which layer is directly bonded to an elastomeric layer, comprising the following steps:
   removing a solvent from an oblong layer of polyethylene gel to obtain an oblong polyethylene film;
   folding said oblong polyethylene film in a longitudinal direction in an overlapping manner to form an oblong tube with an overlapping seam in the longitudinal direction; and
   bonding said polyethylene film directly to the elastomeric layer with no surface treatment or adhesive, to form said hose.

2. Process according to claim 1, wherein the intrinsic viscosity (in decalin at 135° C.) is no less than 8.5 dl/g.

3. Process according to claim 1, wherein the elastomeric layer is composed of a EP(D)M rubber or a styrene/butadiene copolymer or a mixture of at least one of said elastomers with at least one other elastomer.

* * * * *